US008601306B1

(12) United States Patent
Lu et al.

(10) Patent No.: US 8,601,306 B1
(45) Date of Patent: *Dec. 3, 2013

(54) DECRYPTION OF CONFIGURATION DATA FOR MULTI-DIE INTEGRATED CIRCUITS

(75) Inventors: Weiguang Lu, San Jose, CA (US); Eric E. Edwards, Albuquerque, NM (US)

(73) Assignee: Xilinx, Inc., San Jose, CA (US)

( * ) Notice: Subject to any disclaimer, the term of this patent is extended or adjusted under 35 U.S.C. 154(b) by 320 days.

This patent is subject to a terminal disclaimer.

(21) Appl. No.: 12/820,591

(22) Filed: Jun. 22, 2010

(51) Int. Cl.
*G06F 1/00* (2006.01)

(52) U.S. Cl.
USPC .......................................................... 713/500

(58) Field of Classification Search
USPC ................ 713/188, 189, 190, 191, 193, 500; 331/34
See application file for complete search history.

(56) References Cited

U.S. PATENT DOCUMENTS

| | | | |
|---|---|---|---|
| 5,081,678 A * | 1/1992 | Kaufman et al. | 713/161 |
| 6,212,639 B1 * | 4/2001 | Erickson et al. | 726/26 |
| 6,563,340 B1 | 5/2003 | Jones | |
| 6,614,259 B2 | 9/2003 | Couts-Martin et al. | |
| 6,654,889 B1 * | 11/2003 | Trimberger | 713/191 |
| 6,730,540 B2 | 5/2004 | Siniaguine | |
| 6,957,340 B1 * | 10/2005 | Pang et al. | 713/189 |
| 7,095,253 B1 | 8/2006 | Young | |
| 7,397,272 B1 | 7/2008 | Wennekamp | |
| 7,671,624 B1 | 3/2010 | Walstrum, Jr. | |
| 7,702,893 B1 | 4/2010 | Rally et al. | |
| 7,827,336 B2 | 11/2010 | Miller et al. | |
| 7,971,072 B1 * | 6/2011 | Donlin et al. | 713/194 |
| 8,296,578 B1 * | 10/2012 | New | 713/189 |
| 2003/0160633 A1 | 8/2003 | Terrill et al. | |
| 2004/0080341 A1 | 4/2004 | Sasaki et al. | |
| 2004/0178819 A1 | 9/2004 | New | |
| 2006/0047953 A1 * | 3/2006 | Beukema et al. | 713/160 |
| 2006/0076690 A1 | 4/2006 | Khandros et al. | |
| 2006/0216866 A1 * | 9/2006 | Lam et al. | 438/123 |
| 2007/0195951 A1 * | 8/2007 | Leung | 380/37 |
| 2009/0160482 A1 | 6/2009 | Karp et al. | |
| 2009/0161401 A1 | 6/2009 | Bilger et al. | |
| 2010/0153747 A1 * | 6/2010 | Asnaashari et al. | 713/193 |
| 2010/0157854 A1 | 6/2010 | Anderson et al. | |
| 2011/0073996 A1 | 3/2011 | Leung et al. | |
| 2012/0213185 A1 * | 8/2012 | Frid | 370/329 |
| 2013/0009694 A1 | 1/2013 | Camarota | |

OTHER PUBLICATIONS

Xilinx, Inc., Alfke, Peter, Application Note, XAPP 052, Jul. 7, 1996, Version 1.1, "Efficient Shift Registers, LFSR Counters, and Long Pseudo Random Sequence Generators", pp. 1-6, Xilinx, Inc., 2100 Logic Drive, San Jose, CA 95124 US.

(Continued)

*Primary Examiner* — Paul Yanchus, III
*Assistant Examiner* — Alyaa T Mazyad
(74) *Attorney, Agent, or Firm* — Kevin T. Cuenot

(57) ABSTRACT

A method of loading configuration data within an integrated circuit that includes multiple dies is disclosed. The method can include receiving configuration data in encrypted form within a first die of the multiple dies of the integrated circuit and decrypting the configuration data within the first die to generate configuration data in unencrypted form. A portion of the configuration data in unencrypted form can be distributed from the first die to each other die of the multiple dies through an interposer to which each die is attached.

20 Claims, 4 Drawing Sheets

(56) References Cited

OTHER PUBLICATIONS

Oh, Boon Howe, et al., "The Evolution of CPU Packaging Technology and Future Challenges", Proceedings of the 2006 International Conference on Electronic Materials and Packaging, EMAP 2006, Dec. 11-14, 2006, pp. 1-6, IEEE.

Xilinx, Inc. "Virtex-6 FPGA Configuration User Guide", UG360 (v2.0) Nov. 15, 2009, pp. 145-156, Chapter 10, www.xilinx.com, Xilinx, Inc., 2100 Logic Drive, San Jose, CA 95124 US.

U.S. Appl. No. 13/652,874, filed Oct. 16, 2012, Julian Lupu et al.

* cited by examiner

DECRYPTION OF CONFIGURATION DATA FOR MULTI-DIE INTEGRATED CIRCUITS

FIELD OF THE INVENTION

One or more embodiments disclosed within this specification relate to integrated circuits (ICs). More particularly, one or more embodiments relate to decryption of configuration data for multi-die ICs.

BACKGROUND

Programmable integrated circuits (ICs) are a well-known type of IC that can be programmed to perform specified logic functions. One type of programmable IC, the field programmable gate array (FPGA), typically includes an array of programmable tiles. These programmable tiles can include, for example, input/output blocks (IOBs), configurable logic blocks (CLBs), dedicated random access memory blocks (BRAM), multipliers, digital signal processing blocks (DSPs), processors, clock managers, delay lock loops (DLLs), and so forth.

Each programmable tile typically includes both programmable interconnect and programmable logic circuitry. The programmable interconnect circuitry typically includes a large number of interconnect lines of varying lengths interconnected by programmable interconnect points (PIPs). The programmable logic circuitry implements the logic of a user design using programmable elements that can include, for example, function generators, registers, arithmetic logic, and so forth.

The programmable interconnect and programmable logic circuits are typically programmed by loading a stream of configuration data, sometimes called a bitstream, into internal configuration memory cells that define how the programmable elements are configured. The configuration data can be read from memory (e.g., from an external PROM) or written into the FPGA by an external device. The collective states of the individual memory cells then determine the function of the FPGA.

Another type of programmable IC is the complex programmable logic device, or CPLD. A CPLD includes two or more "function blocks" connected together and to input/output (I/O) resources by an interconnect switch matrix. Each function block of the CPLD includes a two-level AND/OR structure similar to those used in programmable logic arrays (PLAs) and programmable array logic (PAL) devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable ICs, the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other programmable ICs are programmed by applying a processing layer, such as a metal layer, that programmably interconnects the various elements on the device. These programmable ICs are known as mask programmable devices. Programmable ICs can also be implemented in other ways, e.g., using fuse or antifuse technology. The phrase "programmable IC" can include, but is not limited to these devices and further can encompass devices that are only partially programmable. For example, one type of programmable IC includes a combination of hard-coded transistor logic and a programmable switch fabric that programmably interconnects the hard-coded transistor logic.

Typically, the configuration data loaded into a programmable IC is highly confidential. A great deal of effort is spent designing circuits specified by the configuration data. To prevent the circuit designs from being used in an unauthorized manner, the configuration data can be encrypted. The encrypted configuration data can be loaded into the programmable IC. The programmable IC then decrypts the configuration data in order to load the configuration data into configuration memory, thereby instantiating the circuit design specified by the configuration data within the programmable IC.

When using a programmable IC that includes a plurality of dies in a single package, various issues arise relating to device security. These issues arise, at least in part, in consequence of the physical architecture of the programmable IC. Since each die in the programmable IC must be configured, each die must be able to access an unencrypted version of the configuration data safely and securely.

SUMMARY

One or more embodiments disclosed within this specification relate to integrated circuits (ICs) and, more particularly, to decrypting configuration data within a multi-die IC. One embodiment of the present invention can include a method of loading configuration data within an IC that includes a plurality of dies. The method can include receiving configuration data in encrypted form within a first die of the plurality of dies of the IC and decrypting the configuration data within the first die to generate configuration data in unencrypted form. A portion of the configuration data in unencrypted form can be distributed from the first die to each other die of the plurality of dies through an interposer to which each die is attached.

Another embodiment of the present invention can include a method of loading configuration data within an IC that includes a plurality of dies. The method can include receiving configuration data in encrypted form within a first die of the plurality of dies of the IC and distributing a portion of the configuration data in encrypted form from the first die to each other die through an interposer to which each die is attached. The method can include, within each die, decrypting a portion of the encrypted configuration data to generate configuration data in unencrypted form.

Another embodiment of the present invention can include an IC including an interposer, a first die, and a second die. The first die can be coupled to the interposer and include a first decryption circuitry configured to decrypt a first portion of configuration data received in encrypted form. The first die can be configurable using the first portion of configuration data in unencrypted form. The second die can be coupled to the interposer. The first die further can be configured to distribute a second portion of the configuration data to the second die via the interposer.

DETAILED DESCRIPTION OF THE DRAWINGS

While the specification concludes with claims defining the features of one or more embodiments of the invention that are regarded as novel, it is believed that the one or more embodiments of the invention will be better understood from a consideration of the description in conjunction with the drawings. As required, one or more detailed embodiments of the present invention are disclosed herein; however, it is to be understood that the one or more embodiments disclosed are merely exemplary of the inventive arrangements, which can be embodied in various forms. Therefore, specific structural and functional details disclosed within this specification are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting, but rather to provide an understandable description of one or more embodiments of the invention.

One or more embodiments disclosed within this specification relate to integrated circuits (ICs) and, more particularly, to decrypting configuration data within a multi-die IC. In accordance with one or more embodiments disclosed within this specification, configuration data that is loaded into a multi-die IC in encrypted form can be decrypted for use by each of the plurality of dies of the multi-die IC. In one or more aspects, one die, e.g., a master die, can include decryption circuitry that decrypts the received configuration data. The configuration data, in unencrypted form, can be made available from the master die to each other die of the multi-die IC. In one or more other aspects, each die can be configured to include decryption circuitry. In that case, the configuration data in encrypted form can be made available to each die of the multi-die IC. Each die can individually decrypt the configuration data.

Figure 1:
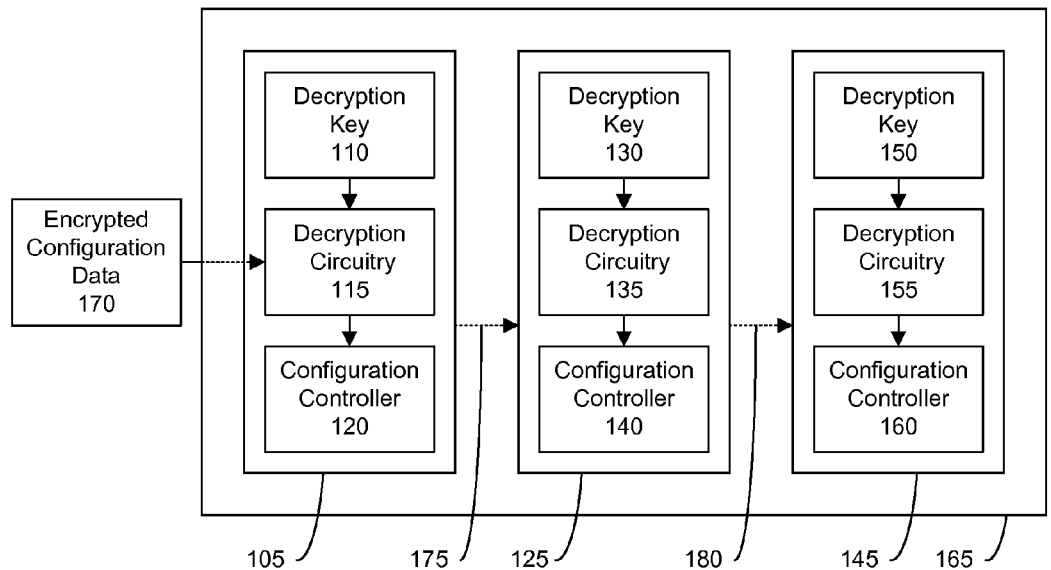
FIG. 1 is a first block diagram illustrating a multi-die integrated circuit (IC) configured for decryption of configuration data in accordance with one embodiment of the present invention.

FIG. 1 is a first block diagram illustrating a multi-die IC 100 configured for decryption of configuration data in accordance with one embodiment of the present invention. FIG. 1 illustrates a distributed decryption mode in which each die of multi-die IC 100 is configured to perform decryption of at least a portion of the configuration data. In general, when operating in distributed decryption mode, only encrypted configuration data is communicated between dies.

As shown, multi-die IC 100 includes three dies 105, 125, and 145. Each of dies 105, 125, and 145 is disposed atop of an interposer 165. In one or more embodiments, each of dies 105, 125, and 145 can be implemented as a programmable IC, e.g., a field programmable gate array. The one or more embodiments disclosed in this specification, however, are not intended to be limited by the particular type of circuit or chip implemented by each die. For example, dies 105, 125, and 145 can be implemented as mixture of programmable ICs, memories, processors, or the like.

An interposer 165 can communicatively link each of dies 105, 125, and 145 by coupling selected pads of each of die 105, 125, and 145. The connections created through interposer 165 can be referred to as inter-die connections, signals, or wires, as the case may be. For purposes of illustration, three dies are shown. The one or more embodiments described within this specification, however, are not intended to be limited by the number of dies disposed upon interposer 165. For example, two, three, four, or more dies can be disposed atop of interposer 165.

As pictured, each of dies 105, 125, and 145 includes a decryption key memory 110, 130, and 150 respectively. Each decryption key memory 110, 130, and 150 can store a decryption key. The decryption key stored within each of decryption key memories 110, 130, and 150 can be the same, e.g., identical, or can be different, e.g., a die-specific key that is unique to each die.

Each of decryption key memories 110, 130, and 150 can be reserved for storing a decryption key that can be used to decrypt all or a portion of configuration data received within each respective one of dies 105, 125, and 145 in encrypted form. In one or more embodiments, decryption key memories 110, 130, and 150 can be implemented as a battery-backed random access memory (BBRAM). In one or more other embodiments, each of decryption key memories 110, 130, and 150 can be implemented as a one-time programmable, electronic-fuse protected memory (e-fuse).

Multi-die IC 100 can be configured to include either one or both of the different types of decryption key memories described within each of dies 105, 125, and 145. A user can select the particular type of decryption key memory that is to be used to store decryption keys via configuration data. For example, the decryption key memory selection data can be provided to multi-die IC 100 with, as part of, appended or pre-pended to, encrypted configuration data 170. The particular data indicating the decryption key memory selection, however, can be unencrypted data. In some cases, however, the particular type of decryption key memory selected and used in one die must be the same as is selected and used in each other die. For example, if e-fuses are used to store the decryption key in die 105, then e-fuses must be used in each of dies 110 and 115.

Each of dies 105, 125, and 145 can include decryption circuitry 115, 135, and 155 respectively. Each decryption key memory 110, 130, and 150 can be coupled to one of decryption circuitry 115, 135, and 155 respectively. Decryption circuitry 115, 135, and 155 can be implemented in the form of circuitry that receives configuration data in encrypted form, e.g., all or a portion of encrypted configuration data 170, and decrypts all or a portion of encrypted configuration data 170 using decryption keys stored in decryption key memories 110, 130, and 145 respectively. Decryption circuitry can be formed of circuit components that, taken collectively, do not execute computer program code, but perform a decryption algorithm. Alternatively, decryption circuitry can include a processor or other controller that does execute computer program code thereby causing that element to perform the decryption algorithm.

Each of dies 105, 125, and 145 further can include a configuration controller 120, 140, and 160 respectively. Each of configuration controllers 120, 140, and 160 can perform configuration operations for dies 105, 125, and 145 respectively. For example, responsive to decryption circuitry generating unencrypted configuration data, i.e., configuration data in unencrypted form, the configuration controller within each die can load configuration data for the relevant die into configuration memory (not shown) of that die. Loading configuration data into configuration memory of a die effectively instantiates circuitry, e.g., some or all of a user circuit design, within the die.

For example, configuration controller 120 can load the portion of configuration data 170 corresponding to die 105, subsequent to decryption by decryption circuitry 115, into configuration memory of die 105. Similarly, configuration controller 140 can load the portion of configuration data 170 corresponding to die 125, subsequent to decryption by decryption circuitry 135, into configuration memory of die 125. Likewise, configuration controller 160 can load the portion of configuration data 170 corresponding to die 145, subsequent to decryption by decryption circuitry 155, into configuration memory of die 145.

Because each of dies 105, 125, and 145 includes decryption circuitry and a decryption key, multi-die IC 100 can be configured to distribute only encrypted configuration data among dies. Since interposer 165 is the mechanism by which data passes between dies 105, 125, and 145, any configuration data that is passed from one die to another can be in encrypted form.

For purposes of illustration, dotted lines illustrate signals that pass through interposer 165. Thus, encrypted configuration data 170 can be loaded into die 105 via interposer 165 and provided to decryption circuitry 115. Die 105 can distribute some or all of encrypted configuration data 170 to die 125 and to die 145 as illustrated by inter-die signals 175 and/or 180. Thus, inter-die signals 175 and/or 180 carry only encrypted configuration data.

Data can be distributed among dies 105, 125, and 145 through interposer 165 using any of a variety of different distribution mechanisms. For example, encrypted configuration data 170 can be passed from die 105 to die 125 via one or more inter-die wires in interposer 165 that directly couple die 105 to die 125. Encrypted configuration data 170 then can be passed from die 125 to die 145 via one or more inter-die wires that directly couple die 125 to die 145. Accordingly, encrypted configuration data 170 can be passed in a daisy chain, e.g., serially, between dies 105, 125, and 145.

In another example, a bus can be implemented within interposer 165 that includes one or more inter-die wires. Each of dies 105, 125, and 145 can be coupled to the bus. In that case, die 105 can broadcast encrypted configuration data 170 to each of dies 125 and 145 simultaneously or concurrently.

Configuration data for multi-die IC 100 includes a plurality of different portions. Each portion generally corresponds to one die. For example, the configuration data used to instantiate a circuit design within multi-die IC 100 can include three different portions, where each portion is, in general, a bitstream that is die-specific. In that case, a first portion, e.g., bitstream, of the configuration data can be used to configure die 105. A second portion of the configuration data can be used to configure die 125. A third portion of the configuration data can be used to configure die 145.

Accordingly, configuration data can be distributed among dies 105, 125, and 145 using a variety of different techniques. In one or more embodiments, each die can be tasked with identifying configuration data relevant to that die. As such, an entirety of encrypted configuration data 170 can be distributed from die 105 to each of dies 125 and 145.

In one or more other embodiments, only a portion of encrypted configuration data 170 can be sent from die 105 to each of dies 125 and 145. For example, die 105 can remove the portion of encrypted configuration data 170 applicable to die 105 and distribute only those portions relevant to configuring dies 125 and 145. In one aspect, die 105 can send all remaining portions of encrypted configuration data 170 to each of dies 125 and 145. In another aspect, die 105 can send each of dies 125 and 145 only the portion corresponding to, e.g., that configures, that specific die. In that case, die 105 can send only the portion of encrypted configuration data 170 that configures die 125 to die 125. Correspondingly, die 105 can send only the portion of encrypted configuration data 170 that configures die 145 to die 145. The configuration controller and/or the decryption circuitry can be configured to send and/or receive configuration data within each die.

In cases where a die distinguishes one portion of the configuration data from another, a delimiter such as a predetermined bit pattern or other marker can be inserted into the configuration data as a delimiter between each portion of the configuration data, e.g., between each die-specific portion. By identifying that delimiter, one portion of the configuration data can be distinguished from another by the decryption circuitry and/or configuration controller, for example.

Figure 2:
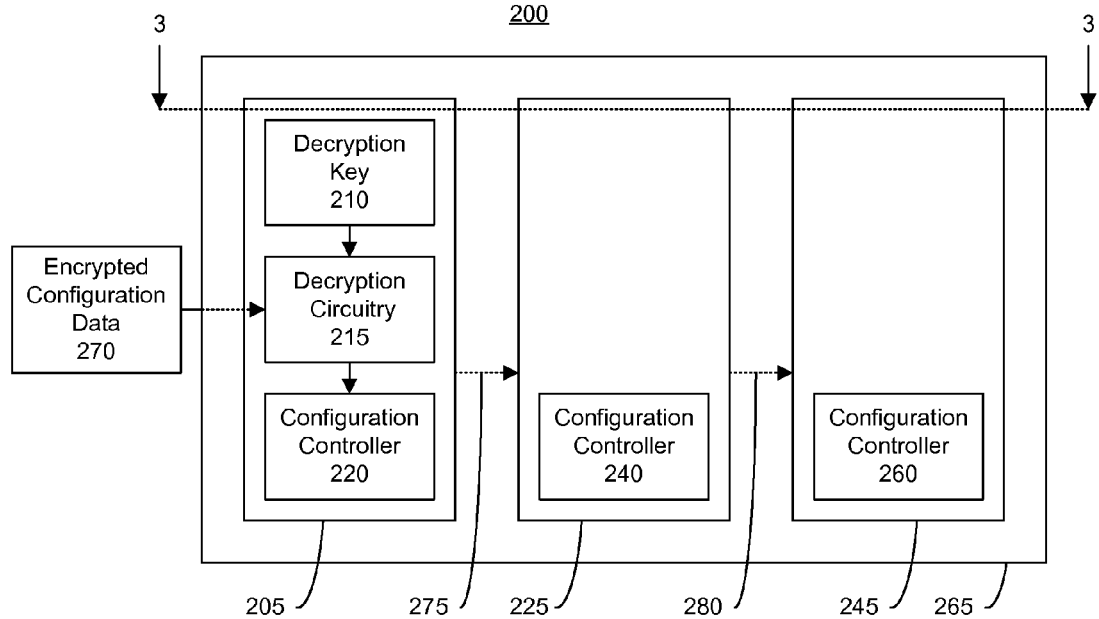
FIG. 2 is a second block diagram illustrating a multi-die IC configured for decryption of configuration data in accordance with another embodiment of the present invention.

FIG. 2 is a second block diagram illustrating a multi-die IC 200 configured for decryption of configuration data in accordance with another embodiment of the present invention. FIG. 2 illustrates a centralized decryption mode in which all decryption operations relating to configuration data for multi-die IC 200 are performed in one die. In general, when operating in centralized decryption mode, apart from receiving the initially encrypted configuration data, only unencrypted configuration data is communicated between dies through the interposer.

Multi-die IC 200 can be implemented in substantially the same manner as multi-die IC 100 of FIG. 1. For example, multi-die IC 200 can include a plurality of dies 205, 225, and 245 disposed atop of an interposer 265. Die 205 can be configured as the master die that performs decryption. Accordingly, die 205 can include a decryption key memory 210, decryption circuitry 215, and a configuration controller 220. Responsive to performing decryption of encrypted configuration data 270, die 205 can distribute configuration data in unencrypted form to each of dies 225 and 245 via inter-die signals 275 and/or 280.

For example, the configuration data in unencrypted from can be distributed from decryption circuitry 225 and/or from configuration controller 220 to each of dies 225 and 245. As shown, die 225 can include a configuration controller 240 and die 245 can include a configuration controller 260. Configuration controller 240 can load configuration data that configures die 225 into configuration memory of die 225. Configuration controller 260 can load configuration data that configures die 245 into configuration memory of die 245.

The various ways in which configuration data in encrypted form, as described with reference to FIG. 1, can be distributed, can be performed or implemented with respect to the one or more embodiments described with reference to FIG. 2. Rather than distributing configuration data in encrypted form, however, configuration data can be distributed in unencrypted form. For example, die 205 can send configuration data in unencrypted form, e.g., the entirety of the configuration data, or specific portions of the configuration data, to each of dies 225 and 245. Because decryption circuitry 215 decrypts the entirety of encrypted configuration data 270, only configuration data in unencrypted form is communicated from die 205 to each of dies 225 and 245 via interposer 265.

It should be appreciated that while FIG. 2 shows only one die, e.g., die 205, as including a decryption key memory and decryption circuitry, each of dies 205, 225, and 245 can include a decryption key memory and decryption circuitry. In that case, when not needed, as is the case in the one or more embodiments illustrated with reference to FIG. 2, the decryption key memory and decryption circuitry can be deactivated or bypassed within each of dies 225 and 245.

Figure 3:
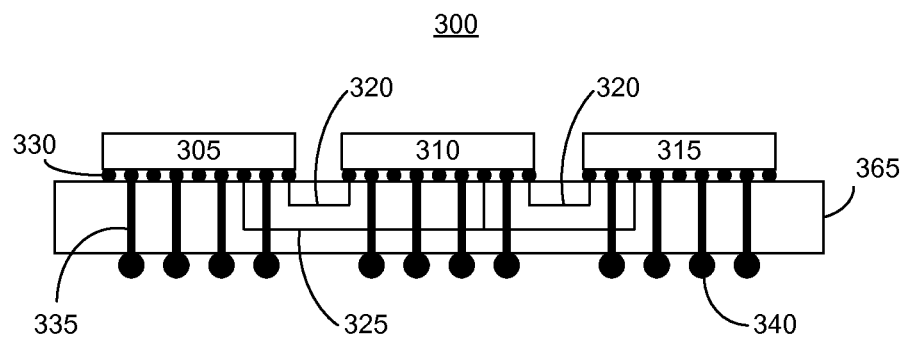
FIG. 3 is a cross-sectional side view of a multi-die IC configured for decryption of configuration data in accordance with another embodiment of the present invention.

FIG. 3 is a cross-sectional side view of a multi-die IC 300 configured for decryption of configuration data in accordance with another embodiment of the present invention. Multi-die IC 300 illustrates a cross-sectional side view taken along cut line 3 in FIG. 2. Multi-die IC 300 can be implemented substantially similar to the multi-die ICs described with reference to FIGS. 1 and 2. In this regard, at least one of dies 305, 310, or 315 can include decryption circuitry and a decryption key stored in decryption key memory coupled to the decryption circuitry. Each of dies 305, 310, and 315 can be bonded to an interposer 365.

Interposer 365 can be implemented as a die formed of one or more layers of an IC manufacturing process. Interposer 365 can include at least one metallization layer, but can include a plurality of metallization layers separated by appropriate insulating or non-conductive layers. The metallization layer, or layers as the case may be, implements inter-die wires 320 and 325. Inter-die wires 320 and 325 couple selected pads of dies 305, 310, and 315.

In one or more embodiments, interposer 365 can be configured as an entirely passive structure within which inter-die wires 320 and 325 are implemented. In one or more other embodiments, interposer 365 can include one or more active devices and, thus, be considered an active structure. The one or more embodiments described within this specification are not intended to be limited to either passive or active interposers.

In general, inter-die wires 320 and/or 325 are implemented as long interconnect lines within interposer 365 that couple different dies. Inter-die wires 320 represent one or more wires within interposer 365 that can directly couple one die to another to facilitate a daisy chain or serial coupling of pads of different dies. For example, one or more pads of die 305 can be coupled directly to one or more pads of die 310 via inter-die wire 320. Similarly, one or more pads of die 310 can be coupled directly to one or more pads of die 315 via inter-die wire 320. Though not shown, an additional inter-die wire, or wires, can be used to couple one or more pads of die 305 directly to one or more pads of die 315. Configuration data, whether encrypted or unencrypted, can be passed among dies 305, 310, and 315 via one or more of inter-die wires 320.

Inter-die wires 325 can represent a bus through which configuration data, whether encrypted or unencrypted, can be distributed from die 305 die to each of dies 310 and 315. For example, configuration data received within die 305 can be distributed to dies 310 and 315 via a dedicated bus formed by inter-die wires 325. A bus facilitates concurrent distribution, e.g., broadcast, of data to each of dies 310 and 315 from die 305 without the delay that typically occurs from propagating data in serial fashion, e.g., by daisy chaining dies together one after the other with data flowing from die 305 into middle die 310 and out from middle die 310 to die 315.

Dies 305, 310, and 315 can be coupled to interposer 365 through a plurality of micro bumps 330. Micro bumps 330 generally are solder balls that electrically couple pads (not shown) of each of dies 305, 310, and 315 to pads (not shown) of interposer 365. The pads of interposer 365 coupled to micro bumps 330 can couple to inter-die wires 320 and 325 or to through silicon vias (TSVs) 335.

Each TSV 335 can extend completely through interposer 365 extending from a pad exposed through a top surface of interposer 365 through to a pad exposed through a bottom surface of interposer 365. Each TSV 335 can couple a pad of one of dies 305, 310, or 315, via a micro bump 330, for example, to one of the plurality of package bumps 340. Package bumps 340, also referred to as "C4 bumps," generally are solder balls that couple to pads on the bottom portion of interposer 365 to the package of multi-die IC 300, and thus, to external pins of the package. Accordingly, one or more pads of die 305, 310, and/or 315 can be coupled to external pins of the package of multi-die IC 300 by coupling such pads to micro bumps 330, to TSVs 335, to package bumps 340, and to external package pins.

In general, configuration data, whether encrypted or unencrypted, can be loaded into multi-die IC 300 through one or more package pins coupled to one or more of package bumps 340, through TSVs 335 coupled to one or more of micro-bumps 330, and into die 305. For example, one or more of the signal paths described can be associated with one another and used to form a configuration port of multi-die IC 300. Configuration data then can be distributed from die 305 to each of dies 310 and 315 using inter-die wires 320 and/or 325 as described.

In one or more embodiments, multi-die IC 300 can be configurable to implement the distributed decryption mode illustrated with reference to FIG. 1 or the centralized decryption mode illustrated with reference to FIG. 2. As described, distributed decryption mode refers to operation of multi-die IC 300 in which each die performs decryption and only encrypted configuration data is sent through interposer 365. Centralized decryption mode refers to operation of multi-die IC 300 in which all decryption of the encrypted configuration data is performed in die 305 and is then distributed to each of dies 310 and 315 via interposer 365 in unencrypted form. In the centralized configuration, only the decryption circuitry within die 305 is utilized.

In one or more embodiments, one or more micro-bumps 330 can be used to determine the decryption mode to be implemented by multi-die IC 300. For example, during the manufacturing process, one or more of micro-bumps 330 for each of dies 305, 310, and 315 can be reserved to select the decryption scheme. The reserved micro-bumps 330 can be either coupled to ground or left floating. When coupled to ground, the reserved micro-bumps remain at the voltage potential of ground, e.g., a logic low. When the reserved micro-bumps are left floating, pull-up circuitry coupled to the reserved micro-bumps 330 pulls the voltage high, e.g., indicating a logic high. A controller or other circuitry within each die can determine the decryption mode based upon the voltage potential of the reserved micro-bumps 330 of each die. In this manner, the decryption mode of each die in multi-die IC 300 can be selected during the manufacturing process through proper coding, e.g., coupling of the reserved micro-bumps 330.

Figure 4:
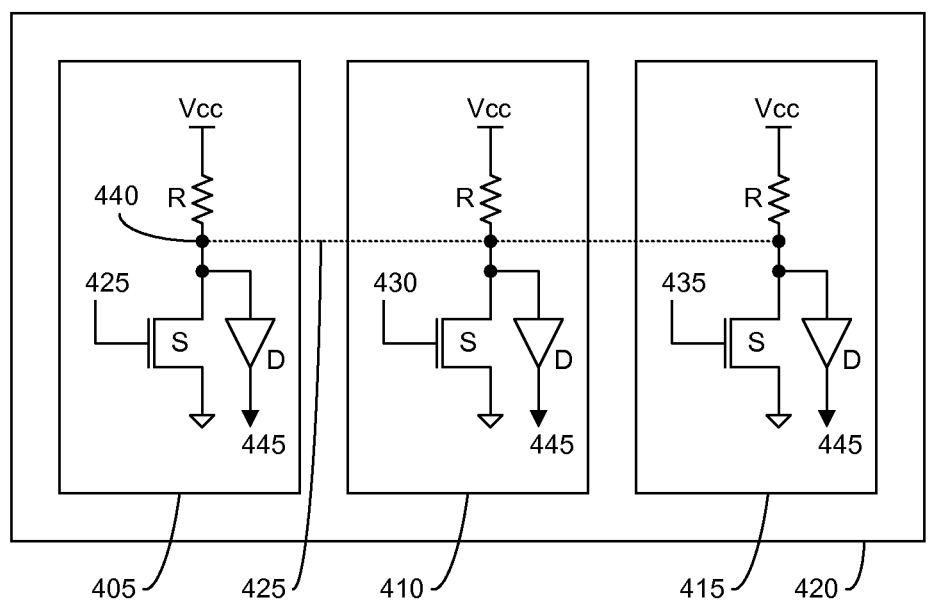
FIG. 4 is a third block diagram illustrating a multi-die IC configured for decryption of configuration data in accordance with another embodiment of the present invention.

FIG. 4 is a third block diagram illustrating a multi-die IC 400 configured for decryption of configuration data in accordance with another embodiment of the present invention. Multi-die IC 400 can be implemented as described with reference to FIGS. 1, 2, and 3. Multi-die IC 400 can be implemented to include one or more global signals that enforce particular operating states across each die. FIG. 4 illustrates one example of how global signals can be implemented to ensure uniformity of operation state across each die of multi-die IC 400.

Multi-die IC 400 can include dies 405, 410, and 415 each being disposed atop of an interposer 420. As shown, each of dies 405, 410, and 415 can include a circuit structure including a pull-up resistor "R" coupled to a voltage source "Vcc" at a first node, and a switch "S", such as a transistor, at the second node of the pull-up resistor. Control signals 435, 430, and 435 can be provide to the gate of the transistor switches "S" within each of dies 405, 410, and 415 respectively. Each of the circuit structures can be coupled together at node 440 via one or more inter-die wires 425. Thus, responsive to any of control signal 425, 430, or 435 being asserted, e.g., transitioning to a logic high, the switch "S" closes and pulls the voltage at node 440 in each of dies 405, 410, and 415 to ground. Responsive to any of control signals 425, 430, or 435 being de-asserted, e.g., transitioning to a logic low, the switch "S" in that die opens, thereby pulling the voltage at node 440 in each of dies 405, 410, and 415 to a logic high, e.g., Vcc.

Node 440, within each of dies 405, 410, and 415, can be coupled to a driver circuit "D." Driver circuit "D" can output a global signal 445 that changes or transitions based upon the state of node 440. For example, global signal 445 can transition high or low responsive to node 440 transitioning high or low respectively. Alternatively, driver circuit "D" can be an inverting circuit so that global signal 445 output from each driver circuit "D" transitions opposite the voltage potential at node 440. In either case, the state of node 440 within any one of dies 405, 410, or 415 determines the state of global signal 445. Global signal 445, being the same within each of dies 405, 410, and 415, can be used to enforce a same or uniform operation state within each respective die.

The circuit structures illustrated in FIG. 4 are shown for purposes of illustration only and are not intended to limit the manner in which global signals are implemented across dies of a multi-die IC. Global signals, however, can be implemented for a variety of purposes relating to enforcement of security related rules across dies. In illustration, one or more global signals can be implemented to enforce a policy of not mixing encrypted and unencrypted configuration data. For example, referring to the distributed decryption mode, when one die detects that encrypted configuration data is being provided, a global signal can be placed in a selected state, thereby forcing each other die to use decryption responsive to the global signal being placed in the selected state. An error signal can be generated, for example, when a first die determines that configuration data used by the first die is encrypted and a second die determines that the configuration data used by the second die is unencrypted.

In another example, one or more global signals can be used to enforce a policy of not mixing the type of decryption key memory used to store decryption keys across dies. More particularly, one or more global signals can be used to force each die to use the same type of decryption key memory, e.g., either BBRAM or e-fuse. For example, as noted, the configuration data can specify the particular type of decryption key memory that is to be used in each die. Once a selection is made in one die, e.g., die 405, that die can place the global signal in a selected state thereby forcing each other die of multi-die IC 400 to store the decryption key within the same type of decryption key memory determined from the configuration data. The global signal enforces uniformity of decryption key memory type across each of dies 405, 410, and 415 of multi-die IC 400 for storage of decryption keys. As such, a condition in which one die uses BBRAM and another uses e-fuse is avoided. In yet another example, one or more global signals can be used to enforce a policy that if any one BBRAM that stores a decryption key is cleared, each other BBRAM in each other die, or at least each BBRAM used to store a decryption key, is also cleared or erased.

Figure 5:
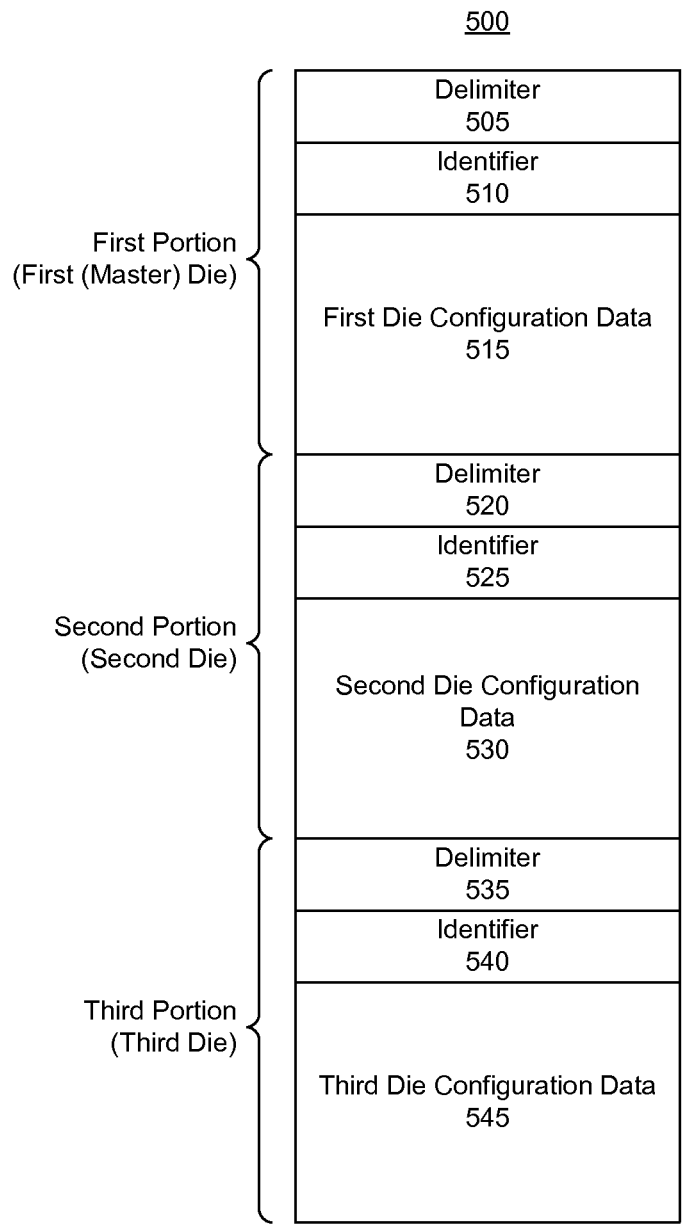
FIG. 5 is a fourth block diagram illustrating configuration data for a multi-die IC in accordance with another embodiment of the present invention.

FIG. 5 is a fourth block diagram illustrating configuration data 500 for a multi-die IC in accordance with another embodiment of the present invention. Configuration data 500 can include three different portions, e.g., three different bitstreams. The first portion can be used to configure a first die, i.e., the master die. The second portion can be used to configure a second die. The third portion can be used to configure a third die. Thus, each portion of configuration data 500 is die-specific.

Delimiters 505, 520, and 535 separate each portion of configuration data. As illustrated, delimiters 505, 520, and 535 can be positioned within configuration data 500 at the beginning of each respective die-specific portion. In one embodiment, each delimiter, in addition to having a predetermined bit pattern that allows each die to recognize the bit pattern as a delimiter, can specify an address indicating the end of the configuration data for the die. For example, the address can be specified in terms of a length that, when added to the address of the delimiter, specifies the ending address of the corresponding configuration data. Thus, delimiter 505 can specify an end address for first die configuration data 515. Delimiter 520 can specify an end address for second die configuration data 530. Delimiter 535 can specify an end address for third die configuration data 545. As noted, each delimiter can be unencrypted so that each die can recognize and read the information specified within the delimiters without first performing decryption. Thus, each die can parse or otherwise distinguish between different portions of configuration data 500.

Identifiers 510, 525, and 540 can be optional. When included within configuration data 500, each identifier can specify a die-specific bit pattern that allows each die to identify or select the portion of configuration data 500 that is to be used to configure that die. Thus, the first die can recognize identifier 510 to select first die configuration data 515 for configuration of the first die. The second die can recognize identifier 525 to select second die configuration data 530. The third die can recognize identifier 540 to select third die configuration data 545. In one or more embodiments, each identifier, when included in configuration data 500, can be encrypted. In one or more other embodiments, each identifier can be unencrypted as are the delimiters.

When identifiers are not included within configuration data 500, it should be appreciated that any die can be configured to utilize the information specified in the delimiters to select the portion of configuration data needed by that die. For example, when configuration data 500 is distributed from the master die to each other die, the first die can a predetermined portion of configuration data 500, e.g., the first, second, or third using the delimiters. Similarly, the second die can be configured to select a predetermined portion of the configuration data 500, e.g., the first, second, or third, using the delimiters. The third die can be configured to select a predetermined portion of configuration data 500, e.g., a first, second, or third using the delimiters. Each die, however, does select a different portion of configuration data 500.

Figure 6:
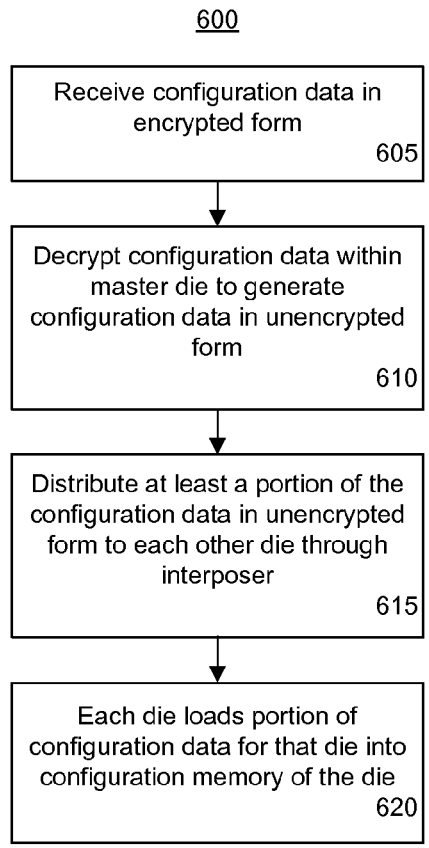
FIG. 6 is a first flow chart illustrating a method of decrypting configuration data within a multi-die IC in accordance with another embodiment of the present invention.

FIG. 6 is a first flow chart illustrating a method 600 of decrypting configuration data within a multi-die IC in accordance with another embodiment of the present invention. Method 600 illustrates an example of centralized decryption for a multi-die IC. Method 600 can be implemented by a multi-die IC as described within this specification, for example, with reference to FIGS. 2, 3, 4 and/or 5.

In step 605, configuration data can be received in encrypted form. More particularly, configuration data can be received within the master die of the multi-die IC. For example, configuration data in encrypted form can be received within the master die via a configuration port that utilizes one or more of the TSVs that couple to pads of the master die. In step 610, the master die can decrypt the configuration data to generate configuration data in unencrypted form. As noted, the decryption circuitry within the master die can decrypt the entirety of the configuration data. It should be appreciated that in one or more other embodiments, since the master die performs all decryption, the delimiters within the configuration data also can be encrypted if so desired.

In step 615, the master die can distribute at least a portion of the configuration data in unencrypted form to each other die of the multi-die IC. As noted, the configuration data in unencrypted form can be distributed through the interposer. The configuration data can include one or more delimiters that separate one die-specific portion of the configuration data from another. Each die specific portion further can include an identifier that allows each die, e.g., the configuration controller within each die, to identify and select the portion of the configuration data that is to be used to configure that particular die.

In one or more embodiments, the entirety of the configuration data can be distributed from the master die to each other die. A copy of the configuration data in unencrypted form can be maintained or kept in the master die. Accordingly, the configuration controller in each die can select the particular portion of the configuration data needed to configure that die. The configuration data in unencrypted form can be broadcast or sent from the master die via a bus within the interposer or sent via daisy chaining from one die to another serially. As noted, each die can be configured to select a predetermined portion of the configuration data. In one or more other embodiments, the master die can be configured to identify each portion of the configuration data and send each die only the portion of the configuration data needed, or to be used, by that die.

In one or more other embodiments, each die can identify the particular portion of the configuration data for that die and utilize the selected portion for configuration. The die can send unused, e.g., the remaining, portions of the configuration data to other dies. In this manner, portions of configuration data can be removed in layers. The configuration data can be passed from one die to another serially with each die removing the portion of the configuration data that is needed by that die. For example, the ordering of the portions of the configuration data can be the same as the order in which the configuration data is passed from one die to another. Accordingly, each die can be configured to select the first portion of configuration data and remove that portion before passing along the unused portions of configuration data to the remaining dies.

In step 620, within each die, the controller can load the portion of the configuration data for that die into configuration memory of the die. As noted, the act of loading configuration data into configuration memory effectively instantiates a circuit design within the multi-die IC.

Figure 7:
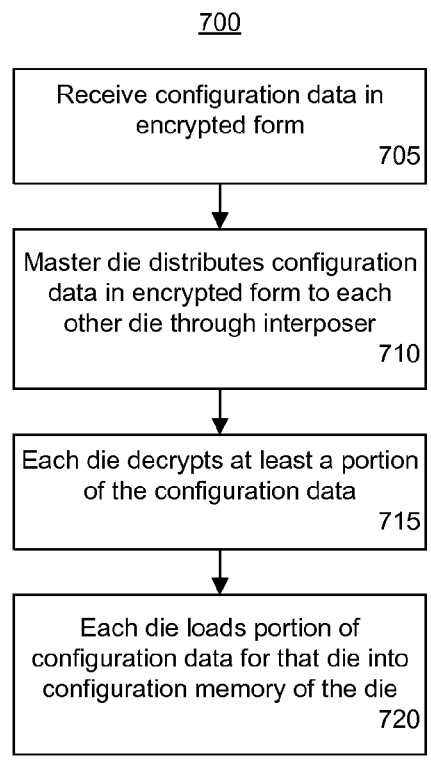
FIG. 7 is a second flow chart illustrating a method of decrypting configuration data within a multi-die IC in accordance with another embodiment of the present invention.

FIG. 7 is a second flow chart illustrating a method 700 of decrypting configuration data within a multi-die IC in accordance with another embodiment of the present invention. Method 700 illustrates an example of distributed decryption for a multi-die IC. Method 700 can be implemented by a multi-die IC as described within this specification, for example, with reference to FIGS. 1, 3, 4, and/or 5.

Method 700 can begin in step 705 where configuration data can be received in encrypted form. Configuration data can be received within the master die of the multi-die IC. For example, configuration data in encrypted form can be received within the master die via a configuration port that utilizes one or more of the TSVs that couple to pads of the master die.

In step 710, the master die can distribute the configuration data in encrypted form to each other die of the multi-die IC. The master die can distribute configuration data in encrypted form using any of the variety of different techniques described within this specification. Though still in encrypted form, for example, the configuration data can include a delimiter that is recognizable by each die, e.g., by the configuration controller and/or decryption circuitry in each die, without performing decryption. The delimiter can be an unencrypted bit pattern. Using an unencrypted delimiter allows each die to distinguish between different die-specific portions of the configuration data while in encrypted form without first performing decryption.

Thus, in cases where each die includes a unique decryption key, the dies can discriminate among the different portions of the configuration data and select the correct die-specific portion of configuration data for purpose of decryption and configuration. For example, as noted, each die can be configured to select a particular portion, e.g., first, second, or third, of the configuration data as determined using the delimiters.

In one or more other embodiments, the identifier that correlates each portion of the configuration data to a specific die also can be recognizable without first performing decryption. Using an unencrypted identifier allows each die to choose or select the portion of the configuration data that is used to configure that die without first performing decryption. Using an identifier in this manner, e.g., not encrypted, allows the master die to distribute configuration data to dies and/or allows each respective die to select the correct portion for decryption and configuration.

It should be appreciated, however, that when each die utilizes a same decryption key, the identifier can be encrypted with the configuration data thereby requiring each die to perform decryption prior to selecting the relevant portion of the configuration data used to configure that die. Alternatively, as noted, identifiers need not be used and configuration data can be passed with each die selecting a predetermined portion of configuration data.

In step 715, each die can decrypt at least a portion of the configuration data locally within that die. In step 720, within each die, the configuration controller can load the portion of the configuration data for that die into configuration memory of the die. As noted, the act of loading configuration data into configuration memory effectively instantiates a circuit design within the multi-die IC.

The flowcharts in the figures illustrate the architecture, functionality, and operation of possible implementations of systems and methods according to various embodiments of the present invention. It should be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved.

Embodiments of the present invention can be realized in hardware or a combination of hardware and software. The embodiments can be realized in a centralized fashion in one system or in a distributed fashion where different elements are spread across several interconnected systems. Any kind of data processing system or other apparatus adapted for carrying out the methods described herein is suited.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising, i.e., open language. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system.

The embodiments disclosed herein can be embodied in other forms without departing from the spirit or essential attributes thereof. Accordingly, reference should be made to the following claims, rather than to the foregoing specification, as indicating the scope of the embodiments of the present invention.

What is claimed is:

1. A method of loading configuration data within an integrated circuit that comprises a plurality of dies, the method comprising:
    receiving configuration data in encrypted form within a first die of the plurality of dies of the integrated circuit;
    decrypting the configuration data within the first die to generate configuration data in unencrypted form; and
    distributing a portion of the configuration data in unencrypted form from the first die to each other die of the plurality of dies through an inter-die wire implemented using a metallization layer within an interposer to which each die is attached.

2. The method of claim 1, wherein decrypting the configuration data comprises:
    within the first die, decrypting an entirety of the configuration data.

3. The method of claim 1, wherein distributing a portion of the configuration data in unencrypted form further comprises:
    sending an entirety of the configuration data in unencrypted form to each die.

4. The method of claim 1, wherein the configuration data comprises a first portion utilized to configure the first die and a second portion, wherein distributing a portion of the configuration data in unencrypted form further comprises:
    sending from the first die to at least one other die only the second portion of the configuration data in unencrypted form.

5. The method of claim 1, wherein, for each die, the configuration data in unencrypted form received by the die is used by a configuration controller within the die to configure the die to implement a circuit design therein.

6. A method of loading configuration data within an integrated circuit that comprises a plurality of dies, the method comprising:
    receiving configuration data in encrypted form within a first die of the plurality of dies of the integrated circuit;
    distributing a portion of the configuration data in encrypted form from the first die to each other die through an inter-die wire implemented using a metallization layer within an interposer to which each die is attached; and
    within each die, decrypting a portion of the encrypted configuration data to generate configuration data in unencrypted form within the die.

7. The method of claim 6, further comprising:
    within the first die, decrypting a first portion of the configuration data in encrypted form using a first decryption key; and
    within a second die of the plurality of dies, decrypting a second portion of the configuration data in encrypted form using a second decryption key.

8. The method of claim 6, wherein the configuration data comprises a first portion that is usable to configure the first die and a second portion, wherein distributing a portion of the encrypted configuration data further comprises:
    sending from the first die to at least one other die only the second portion of the configuration data in encrypted form.

9. The method of claim 6, wherein each die includes a first type and a second type of decryption key memory, the method further comprising:
    selecting one of the first type or the second type of decryption key memory within the first die;
    placing a global signal in a selected state; and
    forcing the second die to use a same type of decryption key memory to store a decryption key as the first die responsive to the global signal communicated between each die.

10. The method of claim 9, wherein the first die and the second die each use a battery backed random access memory type of decryption key memory, wherein responsive to at least one of the first die or the second die deleting the decryption key from the battery backed random access memory in that die, forcing the other of the first die or the second die to delete the decryption key from the battery backed random access memory in the other die.

11. The method of claim 6, wherein the first die comprises first decryption circuitry and the second die comprises second decryption circuitry, the method further comprising:
    forcing the second die to utilize the second decryption circuitry to decrypt the second portion of the configuration data when the first die utilizes the first decryption circuitry to decrypt the first portion of the configuration data responsive to a global signal communicated between the first die and the second die; and
    generating an error signal responsive to determining that the first portion of configuration data is encrypted and the second portion of configuration data is not encrypted.

12. The method of claim 6, wherein, for each die, the configuration data in unencrypted form decrypted within the die is used by a configuration controller within the die to configure the die to implement a circuit design therein.

13. An integrated circuit comprising:
    an interposer comprising an inter-die wire implemented using a metallization layer within the interposer;
    a first die coupled to the interposer and comprising a first decryption circuitry configured to decrypt a first portion of configuration data received in encrypted form, wherein the first die is configurable using the first portion of configuration data in unencrypted form; and
    a second die coupled to the interposer,
    wherein the first die is configured to distribute a second portion of the configuration data to the second die via the inter-die wire within the interposer.

14. The integrated circuit of claim 13, wherein the first decryption circuitry is configured to decrypt an entirety of the configuration data and generate configuration data in unencrypted form, wherein the first die is configured to distribute the second portion of the configuration data in unencrypted form.

15. The integrated circuit of claim 13, wherein the first die is configured to distribute the second portion of the configuration data in encrypted form, wherein the second die comprises a second decryption circuitry configured to decrypt the second portion of the configuration data to generate configuration data in unencrypted form within the second die.

16. The integrated circuit of claim 15, wherein the first die includes a first configuration controller that loads unencrypted configuration data into configuration memory of the first die; and wherein the second die includes a second configuration controller that loads unencrypted configuration data into configuration memory of the second die.

17. The integrated circuit of claim 15, wherein the first decryption circuitry utilizes a first decryption key and the second decryption circuitry utilizes a second and different decryption key.

18. The integrated circuit of claim 15, wherein each die includes a decryption key memory; and wherein the second die uses a same type of decryption key memory to store the decryption key as the first die responsive to a global signal communicated between each die.

19. The integrated circuit of claim 18, wherein the first die and the second die each use a battery backed random access memory type of decryption key memory, wherein responsive to at least one of the first die or the second die deleting the decryption key from the battery backed random access memory in that die, the other of the first die or the second die deletes the decryption key from the battery backed random access memory in the other die.

20. The integrated circuit of claim 15, wherein the second die utilizes the second decryption circuitry to decrypt the second portion of the configuration data when the first die utilizes the first decryption circuitry to decrypt the first portion of the configuration data responsive to a global signal communicated between the first die and the second die; and wherein an error signal is generated responsive to determining that the first portion of configuration data is encrypted and the second portion of configuration data is not encrypted.

* * * * *